US010749642B2

(12) United States Patent
Lida

(10) Patent No.: US 10,749,642 B2
(45) Date of Patent: *Aug. 18, 2020

(54) DYNAMIC RETRANSMISSIONS WITH FIXED AND MINIMUM DELAYS

(71) Applicant: Valens Semiconductor Ltd., Hod Hasharon (IL)

(72) Inventor: Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,652

(22) Filed: Mar. 20, 2019

(65) Prior Publication Data

US 2019/0215107 A1    Jul. 11, 2019

Related U.S. Application Data

(63) Continuation-in-part of application No. 15/630,819, filed on Jun. 22, 2017, now Pat. No. 10,284,483.
(Continued)

(51) Int. Cl.
*H04L 1/18* (2006.01)
*H04L 1/16* (2006.01)
*H04L 1/00* (2006.01)

(52) U.S. Cl.
CPC .......... *H04L 1/1887* (2013.01); *H04L 1/0007* (2013.01); *H04L 1/0018* (2013.01);
(Continued)

(58) Field of Classification Search
CPC ... H04L 1/1887; H04L 1/0007; H04L 1/0018; H04L 1/1628; H04L 1/1835; H04L 1/1874; H04L 1/0045
(Continued)

(56) References Cited

U.S. PATENT DOCUMENTS 5,768,527 A    6/1998 Zhu et al.
6,031,818 A *  2/2000 Lo ..................... H04L 1/1809
                                                    370/216
(Continued)

FOREIGN PATENT DOCUMENTS

EP    2001257 A1 * 12/2008 ........... H04L 1/1874
EP    2001257 A1    12/2008
(Continued)

OTHER PUBLICATIONS

Liu, Cross-Layer Scheduling With Prescribed QoS Guarantees in Adaptive Wireless Networks, IEEE Journal on Selected Areas in Communications, Vol. 23, No. 5, May 2005.
(Continued)

*Primary Examiner* — John J Tabone, Jr.
(74) *Attorney, Agent, or Firm* — Active Knowledge Ltd.

(57) ABSTRACT

A network that supports retransmissions with fixed and minimum delays includes at least first, second and third transceivers. The first transceiver transmits to the second transceiver packets comprising data of first and second data types. The second transceiver: stores the received data in a second buffer; transmits to the third transceiver, without waiting a fixed delay, successfully-received packets comprising data of the first data type, which is encoded with a first error resistance level; and transmits to the third transceiver, after waiting the fixed delay, successfully-received packets comprising data of the second data type, which is also encoded with the first error resistance level. When the second transceiver receives a retransmission request from the third transceiver, it retransmits a packet comprising data of either the first or second data types, encoded with a second error resistance level that is higher than the first error resistance level.

21 Claims, 9 Drawing Sheets

Related U.S. Application Data which is a continuation-in-part of application No. 12/689,359, filed on Jan. 19, 2010, now Pat. No. 9,722,763, which is a continuation-in-part of application No. 11/703,080, filed on Feb. 7, 2007, now Pat. No. 8,565,337.

(52) U.S. Cl.
CPC .......... *H04L 1/1628* (2013.01); *H04L 1/1835* (2013.01); *H04L 1/1874* (2013.01); *H04L 1/0045* (2013.01)

(58) Field of Classification Search
USPC ....... 714/748, 749, 751, 752, 786, 821, 712; 370/217, 218, 222, 241, 242, 244, 250; 375/224, 225
See application file for complete search history.

(56) References Cited

U.S. PATENT DOCUMENTS

| | | | |
|---|---|---|---|
| 6,373,842 B1 | 4/2002 | Coverdale et al. | |
| 6,490,243 B1* | 12/2002 | Tanaka | H03M 13/00 370/216 |
| 6,850,519 B1* | 2/2005 | Saito | H04L 1/007 370/389 |
| 7,031,249 B2* | 4/2006 | Kowalski | H04L 1/0057 370/203 |
| 7,539,187 B2* | 5/2009 | Fellman | H04L 1/004 370/242 |
| 7,636,298 B2* | 12/2009 | Miura | H04L 1/1819 370/216 |
| 7,734,987 B2* | 6/2010 | Kaburaki | H04L 1/0086 714/774 |
| 7,869,463 B2* | 1/2011 | Shiizaki | H04L 1/1887 370/498 |
| 8,050,203 B2* | 11/2011 | Jacobsen | H04L 1/1829 370/310 |
| 8,112,687 B2* | 2/2012 | Pons | H04L 1/0019 375/224 |
| 8,135,015 B2* | 3/2012 | Rajkotia | H04L 1/0075 370/392 |
| 8,171,366 B2* | 5/2012 | Suga | H04B 7/2606 714/748 |
| 8,276,026 B2* | 9/2012 | Jitsukawa | H04L 1/0007 714/708 |
| 8,356,224 B2* | 1/2013 | Kaburaki | H04L 1/0086 714/748 |
| 8,406,244 B2* | 3/2013 | Takagi | H04L 1/0003 370/412 |
| 9,722,763 B2* | 8/2017 | Iida | H04L 1/007 |
| 10,284,483 B2* | 5/2019 | Iida | H04L 1/1877 |
| 2002/0027897 A1 | 3/2002 | Moulsley et al. | |
| 2003/0097629 A1* | 5/2003 | Moon | H04L 1/0003 714/751 |
| 2003/0189892 A1* | 10/2003 | Son | H04B 7/12 370/208 |
| 2004/0177162 A1 | 9/2004 | Wetzel et al. | |
| 2005/0094667 A1* | 5/2005 | Dahlman | H04L 1/1819 370/473 |
| 2005/0147053 A1* | 7/2005 | Saito | H04L 1/007 370/252 |
| 2006/0077919 A1* | 4/2006 | Gerkis | H04L 1/0007 370/315 |
| 2006/0104279 A1* | 5/2006 | Fellman | H04L 12/2854 370/392 |
| 2006/0268871 A1* | 11/2006 | Van Zijst | H04L 12/1836 370/390 |
| 2007/0204294 A1* | 8/2007 | Walker | H04L 12/18 725/38 |
| 2007/0234170 A1* | 10/2007 | Shao | H04L 1/1874 714/746 |
| 2008/0022181 A1* | 1/2008 | Belogolovy | H04L 1/0057 714/751 |
| 2008/0031177 A1* | 2/2008 | Lee | H04H 20/72 370/312 |
| 2008/0187028 A1* | 8/2008 | Lida | H04L 5/143 375/140 |
| 2008/0260067 A1 | 10/2008 | Wengerter et al. | |
| 2009/0034488 A1* | 2/2009 | Takagi | H04L 1/0003 370/335 |
| 2009/0307554 A1* | 12/2009 | Marinier | H04L 1/1812 714/748 |
| 2010/0122135 A1* | 5/2010 | Lida | H04L 1/007 714/748 |
| 2010/0195764 A1* | 8/2010 | Murakami | H04L 1/0071 375/296 |
| 2010/0313095 A1* | 12/2010 | Dinan | H04L 1/1816 714/749 |
| 2010/0322136 A1* | 12/2010 | Kanazawa | H04L 1/0026 370/312 |
| 2011/0078530 A1* | 3/2011 | Shiizaki | H04L 1/1887 714/749 |
| 2012/0170445 A1* | 7/2012 | Perumanam | H04L 1/1838 370/216 |
| 2014/0129893 A1 | 5/2014 | Rigaudeau et al. | |
| 2017/0289058 A1* | 10/2017 | Lida | H04L 1/1877 |
| 2019/0215107 A1* | 7/2019 | Lida | H04L 1/0007 |

FOREIGN PATENT DOCUMENTS

| | | | | |
|---|---|---|---|---|
| EP | 2001257 A4 * | 1/2013 | .......... | H04L 1/0003 |
| WO | WO-2007111295 A1 * | 10/2007 | .......... | H04L 1/0003 |

OTHER PUBLICATIONS

Liu, Cross-Layer Combining of Adaptive Modulation and Coding With Truncated ARQ Over Wireless Links, IEEE Transactions on Wireless Communications, Vol. 3, No. 5, September 2000.

* cited by examiner

740 — Store, by a first transceiver, data of first and second data types; transmit to a second transceiver packets encoded with a first error resistance level; receive a retransmission request; and retransmit with a second error resistance level that is higher than the first error resistance level 742 — Store, by the second transceiver, the received data; transmit to a third transceiver, without waiting a fixed delay, successfully-received packets comprising data of the first data type encoded with the first error resistance level; and transmit to the third transceiver, after waiting the fixed delay, successfully-received packets comprising data of the second data type encoded with the first error resistance level 744 — Receive a retransmission request from the third transceiver, and retransmit a packet comprising data of either the first or second data types, encoded with the second error resistance level

DYNAMIC RETRANSMISSIONS WITH FIXED AND MINIMUM DELAYS

CROSS-REFERENCE TO RELATED APPLICATIONS

This application is a continuation-in-part of application Ser. No. 15/630,819, filed on Jun. 22, 2017, which is a continuation-in-part of application Ser. No. 12/689,359, filed on Jan. 19, 2010, now U.S. Pat. No. 9,722,763, which is a continuation-in-part of application Ser. No. 11/703,080, filed on Feb. 7, 2007, now U.S. Pat. No. 8,565,337, both incorporated herein by reference.

BACKGROUND

Communication networks implement retransmission mechanisms with either a fixed delay (where all the successfully received packets are stored and forwarded after a predetermined delay) or a minimal delay (where the successfully received packets are forwarded as soon as possible). Implementing the retransmission mechanisms with either a fixed delay or a minimal delay simplifies the network switches, and thus has been the preferred solution so far. However, these simplified network switches cannot simultaneously provide optimal services for both data types that require fixed delay (such as uncompressed video data) and data types that are more suitable for minimal delay (such as USB data). Therefore, there is a need for a new type of communication network that supports both fixed delay retransmissions and minimal delay retransmissions.

SUMMARY

In one embodiment, a network supporting retransmissions with fixed and minimum delays comprises first, second and third transceivers. The first transceiver is configured to: store data of first and second data types in a first buffer; transmit to a second transceiver packets comprising the data encoded with a first error resistance level; receive from the second transceiver a retransmission request; and retransmit a packet comprising data of either the first or second data types, encoded with a second error resistance level that is higher than the first error resistance level. The second transceiver is configured to: store the data received from the first transceiver in a second buffer; transmit to a third transceiver, without waiting a fixed delay, successfully-received packets comprising data of the first data type, which is encoded with the first error resistance level; and transmit to the third transceiver, after waiting the fixed delay, successfully-received packets comprising data of the second data type, which is encoded with the first error resistance level. The second transceiver is further configured to: receive a retransmission request from the third transceiver; and retransmit a packet comprising data of either the first or second data types, encoded with the second error resistance level.

In another embodiment, a method for retransmitting with fixed and minimum delays includes the following steps: performing the following by a first transceiver: storing data of first and second data types in a first buffer; transmitting to a second transceiver packets comprising the data encoded with a first error resistance level; receiving from the second transceiver a retransmission request; and retransmitting a packet comprising data of either the first or second data types, encoded with a second error resistance level that is higher than the first error resistance level. The method further includes performing the following by the second transceiver: storing the data received from the first transceiver in a second buffer; transmitting, by the second transceiver to a third transceiver, without waiting a fixed delay, successfully-received packets comprising data of the first data type, which is encoded with the first error resistance level; transmitting, by the second transceiver to the third transceiver, after waiting the fixed delay, successfully-received packets comprising data of the second data type, which is encoded with the first error resistance level; and responsive to receiving a retransmission request from the third transceiver, retransmitting, by the second transceiver, a packet comprising data of either the first or second data types, encoded with the second error resistance level.

BRIEF DESCRIPTION OF THE DRAWINGS

The embodiments are herein described by way of example only, with reference to the accompanying drawings. In the drawings:

FIG. 8 illustrates one embodiment of a method for retransmitting with fixed and minimum delays.

DETAILED DESCRIPTION

Figure 1A:
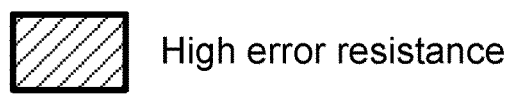
FIG. 1A illustrates one embodiment of retransmitting a packet whose header and tail feature a higher error resistance than its payload.
Figure 1A:
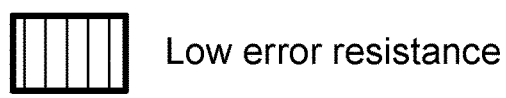
Figure 1A:
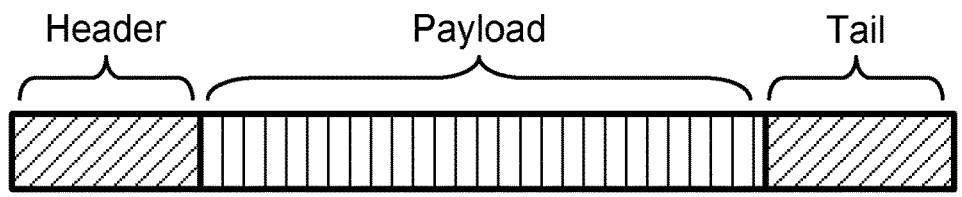
Figure 1A:
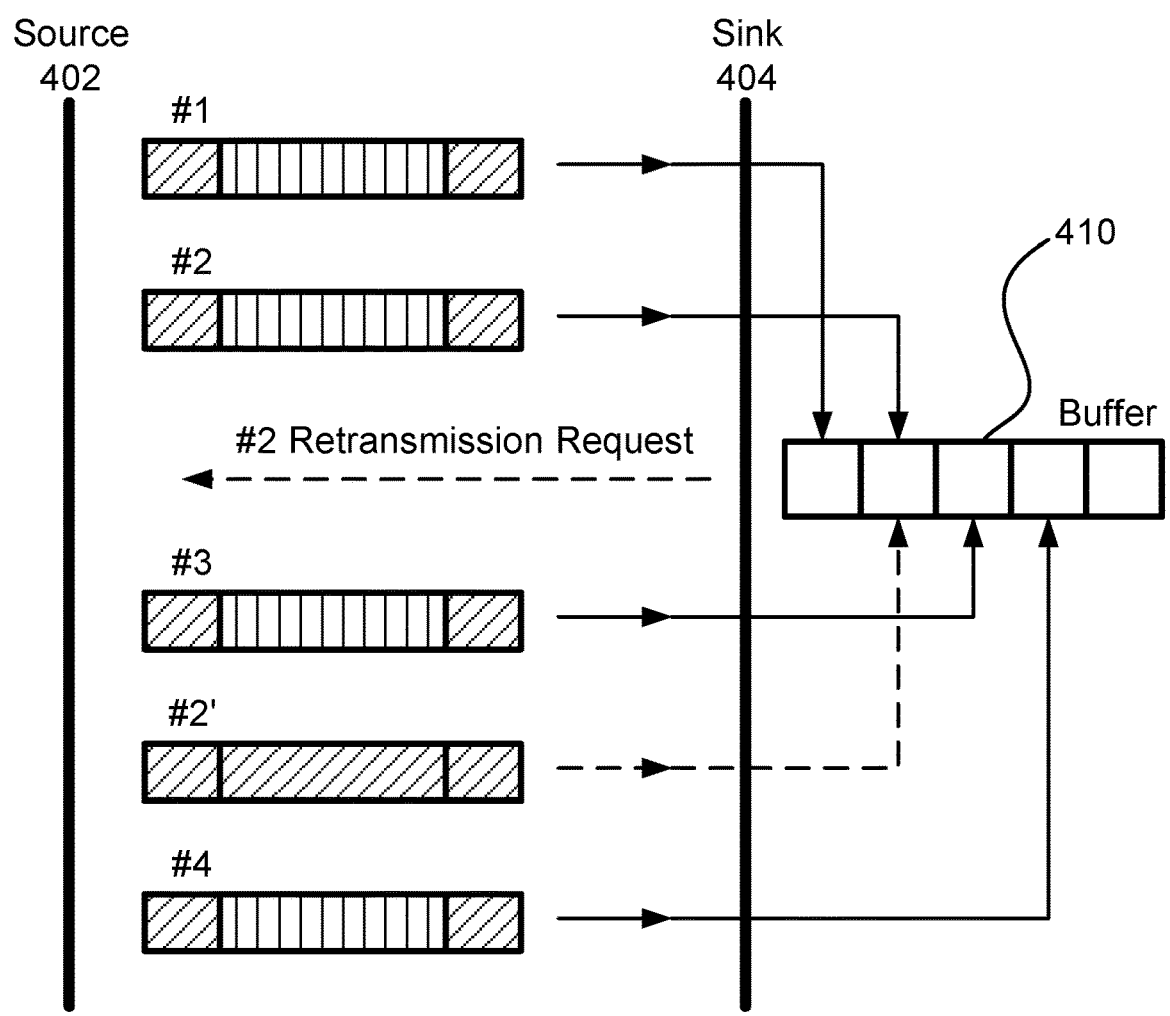

FIG. 1A illustrates one embodiment of retransmitting a packet whose header and tail feature a higher error resistance than its payload. Certain types of packets (#1, #2, #3, #4) of a first transmission are encoded to have a packet error rate much worse than the target packet error rate, while the retransmitted packets are encoded such that their packet error rate is approximately equal to or better than the target packet error rate. The source 402 sends packets to sink 404 at a predetermined rate. The source 402 stores the data transmitted through the packets for a period of time approximately equal to or longer than the round trip delay. The sink 404 receives the packets, checks the received packets for errors and/or missing packets, and requests retransmission of the erroneous packets (where erroneous packets also include the missing packets). Meanwhile, the source 402 continues to send packets at the predetermined rate, and sends the next packet(s) (in this example, packet #3), until it retransmits the erroneous packet (in this example, packet #2). Optionally, the payload of the retransmitted packet #2' is encoded using error resistance higher than the error resistance of packet #2, in order to ensure that no additional retransmissions will be required. After sending packet #2' to replace the erroneous packet #2, the source 402 sends the next unsent packet #4 according to the original order. On the receiving side, the sink 404 maintains the original order of the data by replacing the payload of the erroneous packet #2 in buffer 410 with the payload of the retransmitted packet #2'.

Different sections of the packet may feature different error resistances as a result of implementing different encoding schemes, as discussed, for example, in U.S. Pat. No. 8,565, 337, which is incorporated herein by reference. Alternatively, different sections of the packet may feature different error resistances as a result of implementing Forward Error Correction (FEC) techniques.

In one example, the communication link illustrated in FIG. 1A is used to transmit HDMI signals. In order to exploit the link to its maximum extent, the first set of packets delivers the HDMI data with a packet error rate of 1e-3 and CRC-32, and the retransmitted packets are delivered with a packet error rate of 1e-11, which is better than the packet error rate of 1 e-9 required by the HDMI standard.

Figure 1B:
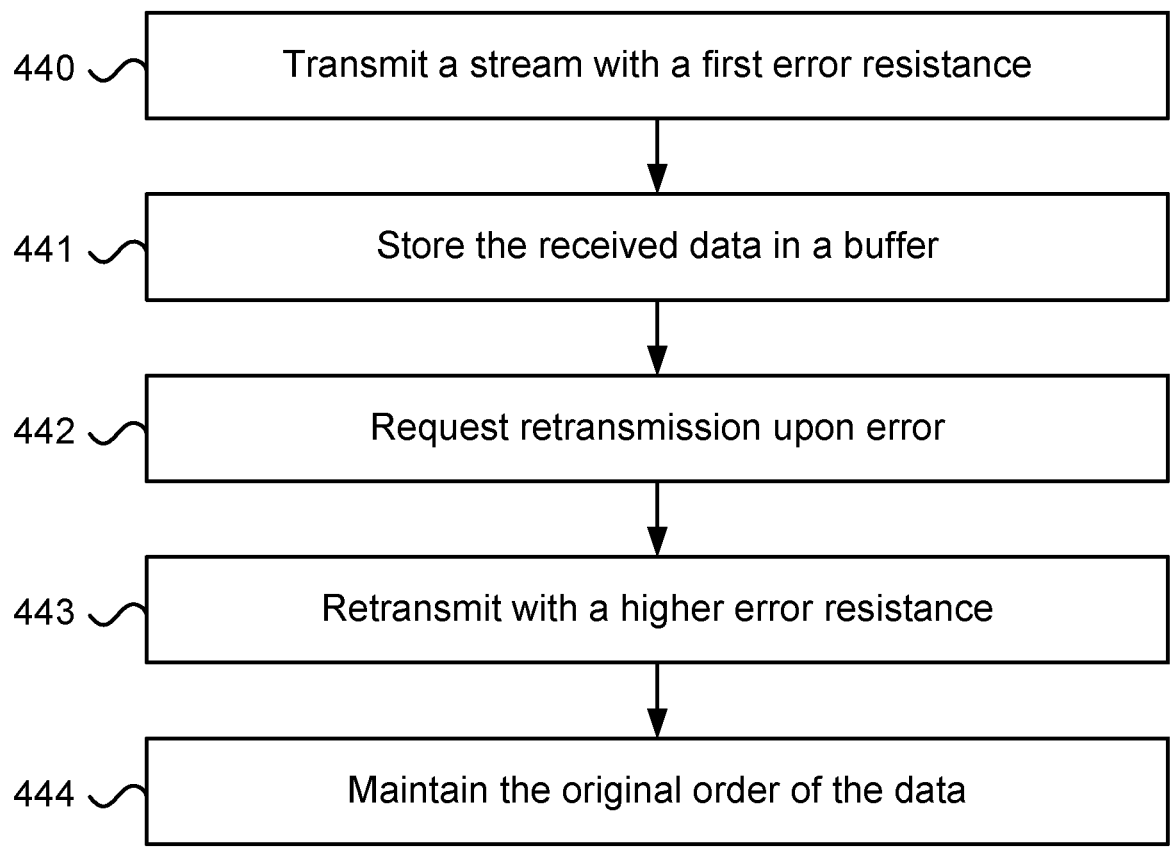
FIG. 1B is a flow diagram illustrating one method for operating a communication link close to its maximum capacity while maintaining the original order of transmitted data.

FIG. 1B is a flow diagram illustrating one method for operating a communication link close to its maximum capacity while maintaining the original order of transmitted data. The method comprises the following steps: In step 440, transmitting at least one stream of data at a predetermined rate; the transmitted data featuring a first error resistance level. In step 441, storing the received data in a buffer. In step 442, requesting data retransmission upon detection of an error. In step 443, retransmitting the data with a second error resistance level that is higher than the first error resistance level. And in step 444, inserting the retransmitted data into the proper location in the buffer so as to maintain the original order of the data. In one embodiment, the method is operated over each hop of a network that maintains the original order of the data and features a short and approximately fixed latency with latency variation below 5 microseconds (usec). In one embodiment, the detected error includes a missing packet error, and further comprising identifying the missing packet using a packet identification code that is assigned according to a predefined series of codes. In one embodiment, the stream comprises time-sensitive data, and the method ensures approximately fixed latency with latency variation below 5 usec.

Figure 2:
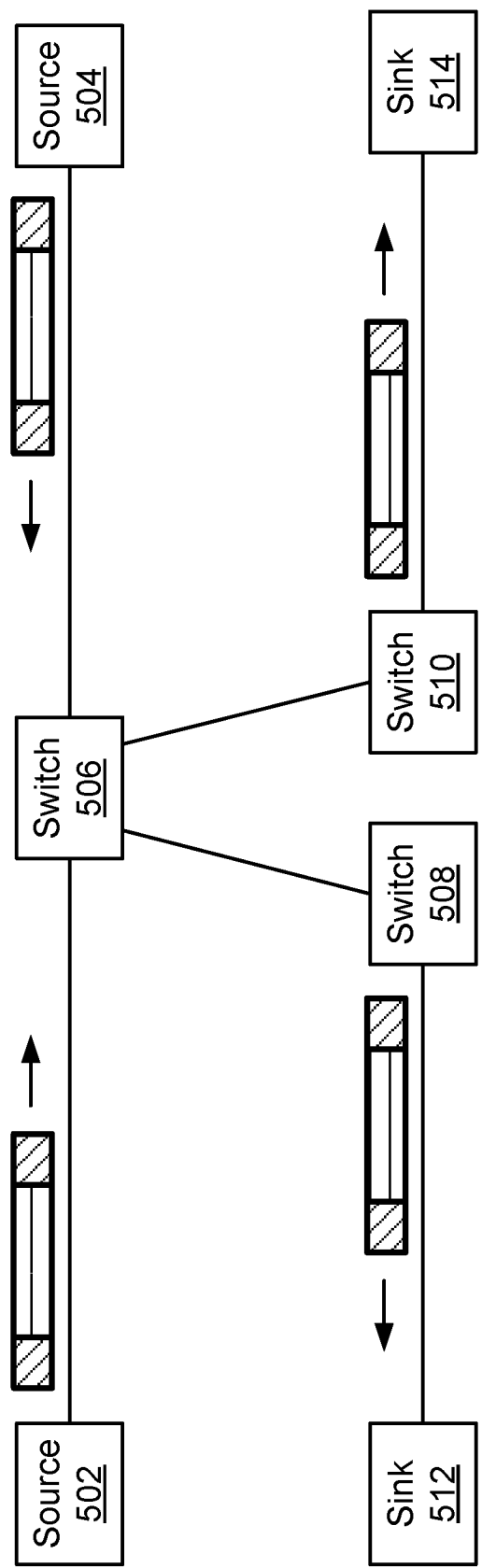
FIG. 2 illustrates a network that implements the method illustrated by FIG. 1A over each hop.

FIG. 2 illustrates a network that implements the method illustrated by FIG. 1A over each hop. Thus, the entire network maintains the order of the transmitted packets, and requests for retransmissions are responded to using packets with improved error resistance and, for the most part, without adversely affecting the original streams transmitted from the sources 502 and 504. Optionally, the sources 502 and 504 transmit the original streams approximately according to a fixed transmission rate. Optionally, the network approximately ensures a fixed latency with latency variation below 5 usec. Optionally, the sources 502 and 504 receive the data from end devices that do not support retransmission.

In one embodiment, the switches 506, 508, and 510 of the network illustrated in FIG. 2 comprise buffers and therefore the network can operate well with legacy end devices 502, 504, 512, and 514 that do not support retransmission. In this embodiment the total latency of the network may also be reduced when retransmission is not required over at least one of the hops.

Figure 3:
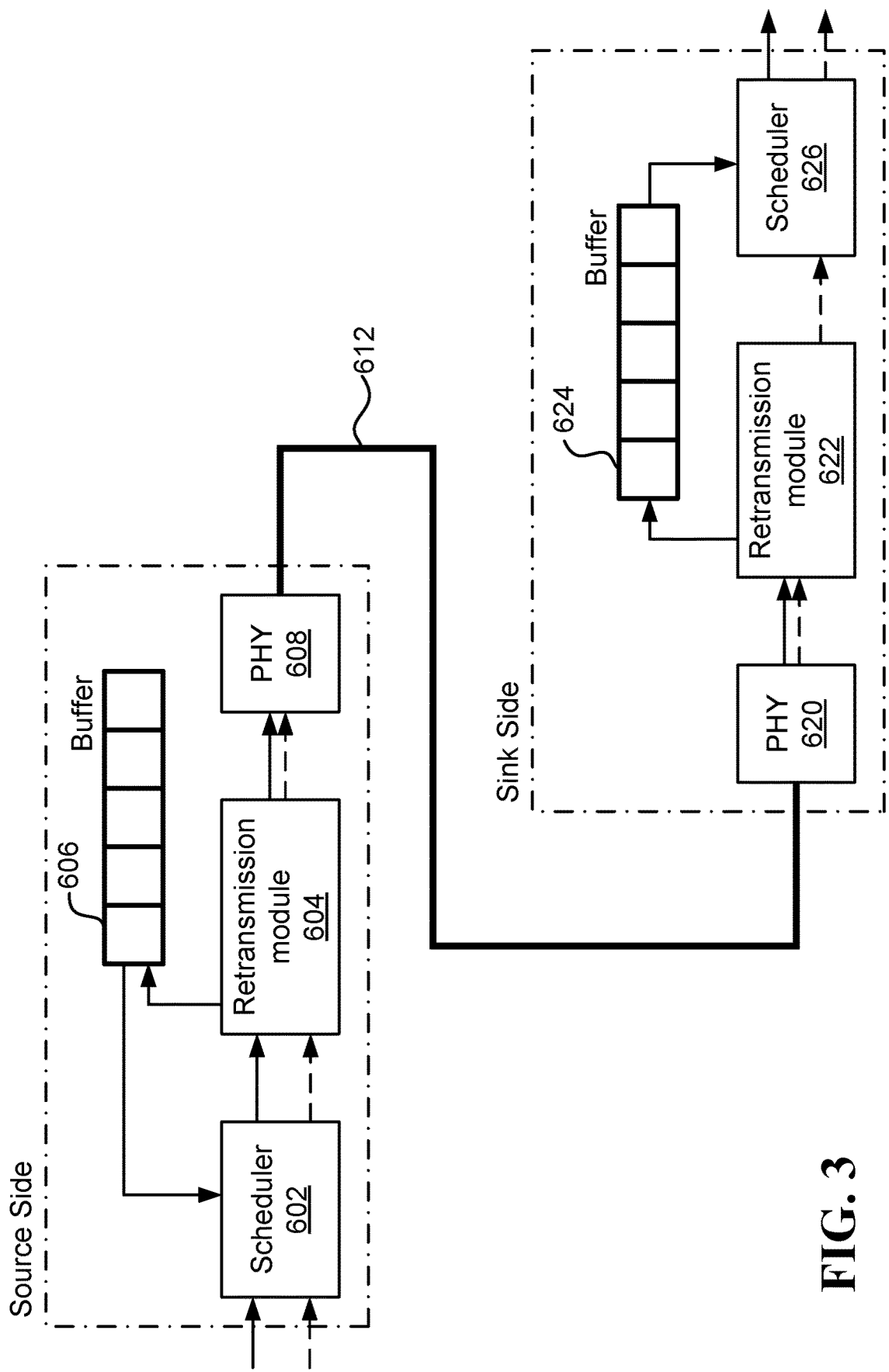
FIG. 3 illustrates one embodiment of source and sink devices supporting retransmissions and fixed delay for at least some of the streams.

FIG. 3 illustrates one embodiment of source and sink devices supporting retransmissions and fixed delay for at least some of the streams. On the source side, the source's scheduler 602 receives a first stream to be protected by the retransmission mechanism (marked by a solid line) and a second stream that is not to be protected by the retransmission mechanism (marked by a dashed line). The source's retransmission module 604 optionally adds additional packet identification data to the first stream packets in order to identify their sequential order, and then stores a section of the first stream in the source's buffer 606. The first and second streams are transmitted by the source's physical layer component 608 over the link 612, and are received on the sink side by the receiver's physical layer component 620. The receiver's retransmission module 622 forwards the packets of the second stream to the receiver's scheduler 626, with or without a CRC check, and forwards the packets of the first stream to the receiver's buffer 624. Upon detection of a CRC error in a first stream packet, or detection of a missing packet, optionally based on a gap in the additional packet identification data, the receiver's retransmission module 622 sends a proper retransmission request to the source. The source's retransmission module 604 extracts the required packet from the source's buffer 606, re-encodes the packet to feature a better error resistance, and sends the retransmitted packet to the sink. In order to maintain the original order of the packets, the receiver uses the receiver's buffer 624 to introduce latency on all protected packets, proper or erroneous, and the receiver's retransmission module 622 inserts the retransmitted packet into its original position in the receiver's buffer 624. After the required latency period passes, the packets from the receiver's buffer 624 are forwarded to the receiver's scheduler 626.

In one embodiment, the communication link illustrated in FIG. 3 carries multimedia signals. The video pixel data is protected by retransmissions, while latency sensitive data that does not have to be synchronized to the video pixel data is transmitted over the second stream that is not to be protected by the retransmission mechanism, and therefore without the fixed delay. In this case, neither the transmitter, nor the receiver needs to store the unprotected packets in the retransmission buffer. In one embodiment, the retransmission protection mechanism is not required because the unprotected data types are transmitted using a much higher error resistance level, such as lower PAM, than the initial protected packets. For example, link control messages and video DDC signals and may be transmitted with a high error resistance and without the retransmission mechanism.

In one embodiment, a first video stream is protected by the retransmission mechanism and a second video stream is not protected by the retransmission mechanism. Therefore, the unprotected video stream features a shorter link delay than the protected video stream. In one embodiment, the maximal link delay determines the maximum number of retransmissions, which determines the amount of traffic to be protected by the retransmission mechanism.

There are cases where it is necessary to utilize a communication channel approximately to its maximum capacity, while maintaining the order of the transmitted packets and a fixed and short latency. In order to utilize the communication channel approximately to its maximum capability, the data cannot be protected only by Forward Error Correction (FEC) code, which consumes extra bandwidth when the interference over the communication link cannot be accurately predicted. Therefore, erroneous packets that cannot be corrected by the optional FEC code have to be retransmitted. And in order to maintain the order of the transmitted packets and a fixed and short latency, the retransmitted packets should be requested as soon as the receiver identifies an error in a received packet, and/or identifies a missing packet.

In one embodiment, a communication link comprises first and second transceivers. The first transceiver transmits a first set of packets at a predetermined rate with a first error resistance level and stores the transmitted data in a buffer. The second transceiver receives the first set of packets, checks the packets for errors, and upon detecting an erroneous packet, requests retransmission of the erroneous packet. The first transceiver receives the retransmission request and retransmits the relevant data using one or more packets encoded with a second error resistance level that is higher than the first error resistance level. Then the second transceiver forwards the data received in the packets according to its original order approximately after a fixed delay. In one embodiment, the average throughput and maximum burst of the retransmissions are controlled such as not to over a predefined amount, not to overload the link, not to interfere with the proper transmission of the first set of packets, to bring the maximal throughput of the transmissions of the first set of packets and the retransmitted packets to the maximum capacity of the communication link, and/or not to increase the delay above a certain value. The retransmissions may be controlled by the first transceiver, the second transceiver, and/or any other appropriate element. In one embodiment, the retransmitted packets are transmitted with a priority higher than the priority of the first set of packets. Retransmitting the packets with a higher priority may reduce the latency of the communication link by shortening the time between requesting a retransmission and receiving the retransmitted packet. The embodiments may be implemented over a variety of mediums, such as a wired medium, a wireless medium, or an optical medium. Moreover, the embodiments may be used to create a network that ensures an approximately fixed latency with latency variation below 5 usec. Such a network may also operate well with end devices that do not support retransmission.

In one embodiment, a receiver comprises a packet buffer coupled to a packet processing element. The packet buffer stores the received packets and the packet processing element detects erroneous packets and sends a retransmission request upon detection of an erroneous packet. Optionally, the packets include a packet identification code that is assigned according to a predefined series of codes and the packet processing element identifies the missing packets by comparing the packet identification codes of the received packets with the expected packet identification codes of the series. When receiving the retransmitted packet, the packet processing element maintains the original order of the packets by inserting the retransmitted packet to its proper location.

In one embodiment, a network switch includes multiple transceivers supporting packet retransmissions with a higher error resistance than the initial transmitted packet. The retransmissions are initiated by the receiver side and a network comprising at least two links and at least one such switch maintains the original order of the packets and features a short and approximately fixed latency with latency variation below 5 usec. In one embodiment, the network carries one or more main streams, and the maximum amount of retransmitted packets is determined so as not to interfere with the proper transmission of the main streams. In one embodiment, the network's latency is reduced by retransmitting the packets with a priority higher than the priority of most of the initial transmitted packets.

Figure 4:
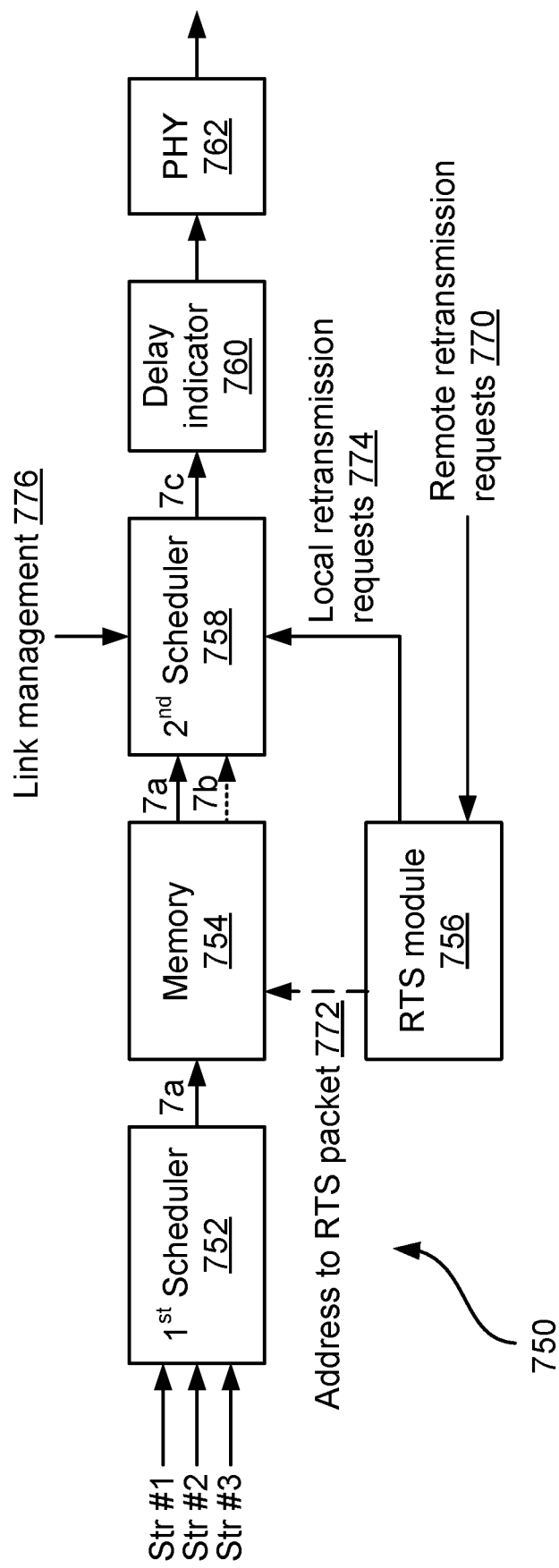
FIG. 4 illustrates one embodiment of a transceiver configured to indicate delays added to packets due to retransmission events.

FIG. 4 illustrates one embodiment of a transceiver 750 configured to indicate delays added to packets due to retransmission events. The transceiver 750 includes at least a first scheduler 752, memory 754, a retransmission module 756, a second scheduler 758, a delay indicator module 760, and a physical layer module 762.

The first scheduler 752 receives one or more packet streams (denoted Str #1, Str #2, Str #3); the packet streams may be received, for example, from input ports or from processes running in the transceiver. The first scheduler 752 multiplexes the received packet streams (Str #1, Str #2, Str #3) into a first multiplexed packet stream 7a, and adds time indications for at least some of the packets. The memory 754 receives and stores the first multiplexed packet stream 7a and its corresponding time indications.

The retransmission module 756 receives retransmission requests 770 and selects data for retransmissions. Optionally, the retransmission requests 770 are received from a second transceiver that communicates with the transceiver 750 over a communication link, such as a wired communication link. The retransmission requests 770 are received for data that was already transmitted by the transceiver to the second transceiver.

The second scheduler 758 receives the first multiplexed packet stream 7a and the data for retransmission 7b, and multiplexes them into a second multiplexed packet stream 7c. The second scheduler 758 may also receive link management data 776 and multiplex it into the second multiplexed packet stream 7c. Examples of link management data 776 include self-initiated retransmissions, link management packets, and known data used for learning and maintaining the communication link.

The delay indicator module 760 utilizes the time indications to calculate the delays added to packets of the second multiplexed packet stream 7c as a result of fulfilling the retransmission request. In one example, the time indications are a function of the local clock of transceiver 750, and the delay indicator module 760 calculates the delay that is added to a packet that belongs to the second multiplexed packet stream 7c by subtracting the current local clock time from the time indication associated with that certain packet. The delay indicator module 760 adds the calculated delays to at least some of the packets of the second multiplexed packet stream. In one example, the delay indicator module 760 adds the calculated delays to all the packets of the second multiplexed packet stream. In another example, the delay indicator module 760 adds the calculated delays only to some of the packets of the second multiplexed packet stream, such as only to packets for which the calculated delay exceeds a predetermined threshold. In still another example, the calculated delay accounts for the time from receiving a packet at the first scheduler until it is forwarded to the physical layer for transmission. Then the physical layer module 762 transmits the second multiplexed packet stream to the second transceiver, optionally over a wired communication link.

Optionally, the transceiver 750 transmits to the second transceiver payloads of packets that were not retransmitted using a first error resistance level, and transmits to the second transceiver payloads containing retransmitted data using a second error resistance level. The second error resistance level is higher than the first error resistance level in order to reduce the probability for another retransmission. In some cases the second error resistance level is strong enough to ensure that a single retransmission is enough to transmit successfully the retransmitted data.

In one optional embodiment, the second transceiver receives the packets from the transceiver, transmits the successfully-received packets after a fixed delay with a first error resistance level to a third transceiver over a wired communication link, stores the payloads in a second memory, receives a second retransmission request for a second payload that is included in the payloads stored in the second memory, and retransmits the second payload using a second retransmission packet encoded with a second error resistance level that is higher than the first error resistance level. Optionally, the second error resistance level may be strong enough to ensure that a single retransmission is enough for transmitting successfully the second payload.

Optionally, the clocks of the transceiver and the second transceiver are not synchronized, and the second transceiver uses the calculated delays, which are stored in the packets it receives, to adjust the order and idle durations between the packets it receives in order to compensate for at least some of the delays incurred as a result of the retransmission event at the transceiver 750. Optionally, the memory 754 is a shared memory, and the data for retransmission is selected from the first multiplexed packet stream stored in the memory.

Figure 5:
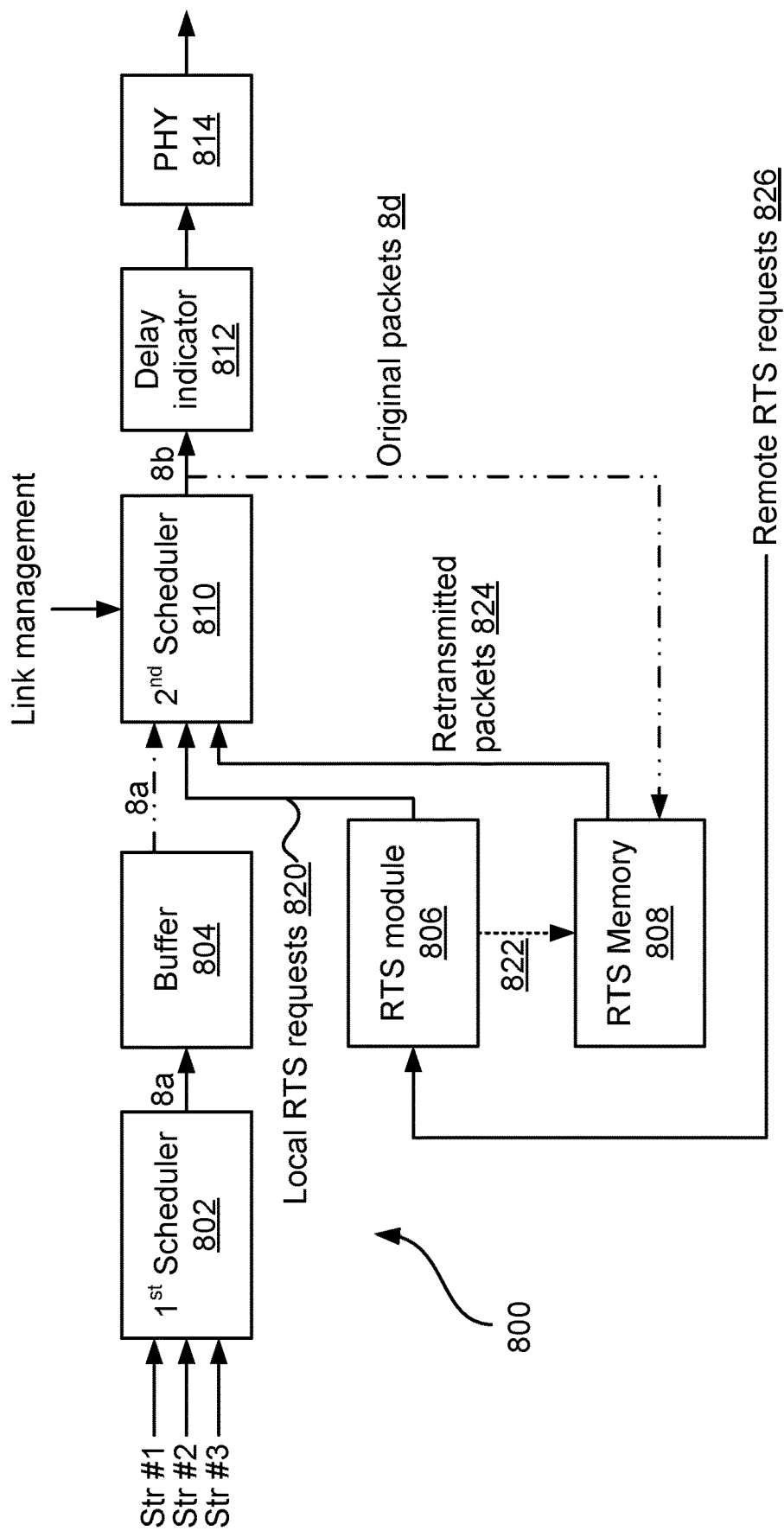
FIG. 5 illustrates one embodiment of a transceiver having at least two memories.

FIG. 5 illustrates one embodiment of a transceiver 800 having at least two memories. The transceiver 800 includes at least: a first scheduler 802 similar to the first scheduler 752; a buffer 804 that stores the first multiplexed packet stream 8a while waiting for transmission; a retransmission memory 808 that stores the already transmitted packet 8d while waiting for possible retransmission; a retransmission module 806 that receives remote retransmission requests 826, may issue local retransmission requests 820, and selects the data to be retransmitted from the retransmission memory 808 using command line 822; a second scheduler 810 that is similar to the second scheduler 758; a delay indicator module 810 that is similar to the delay indicator module 760; and a physical layer module 814 that is similar to the physical layer module 762.

The second scheduler (758, 810) may further receive link management packets, and multiplex them into the second multiplexed packet stream. Link management packets are packets generated by the transceiver for operating the link, such as a request for a retransmission issued by the transceiver, link control massages, massages for learning the link properties, and massages for handling interferences.

Optionally, the first scheduler, the retransmission module, the second scheduler, and the delay indicator module are implemented using one or more processors. Optionally, the retransmission module and the memory are designed to support multi retransmission events for the same data. Alternatively, the retransmission module and the memory are designed to support just a single retransmission event for the same data. Optionally, the physical layer module is an HDBaseT® physical layer module, and the second multiplexed packet stream is an HDBaseT® stream.

In one embodiment, the transceiver (750, 800) is incorporated in a network switch that supports retransmissions having latency variation below 5 usec. The transceiver 750 may be connected through a second switch to a sink device, such as a device that displays video that is streamed through the switch transceiver 750. Optionally, the retransmission module 756 may add additional packet identification data to the packet stream in order to identify the sequential order of the packets.

Figure 6:
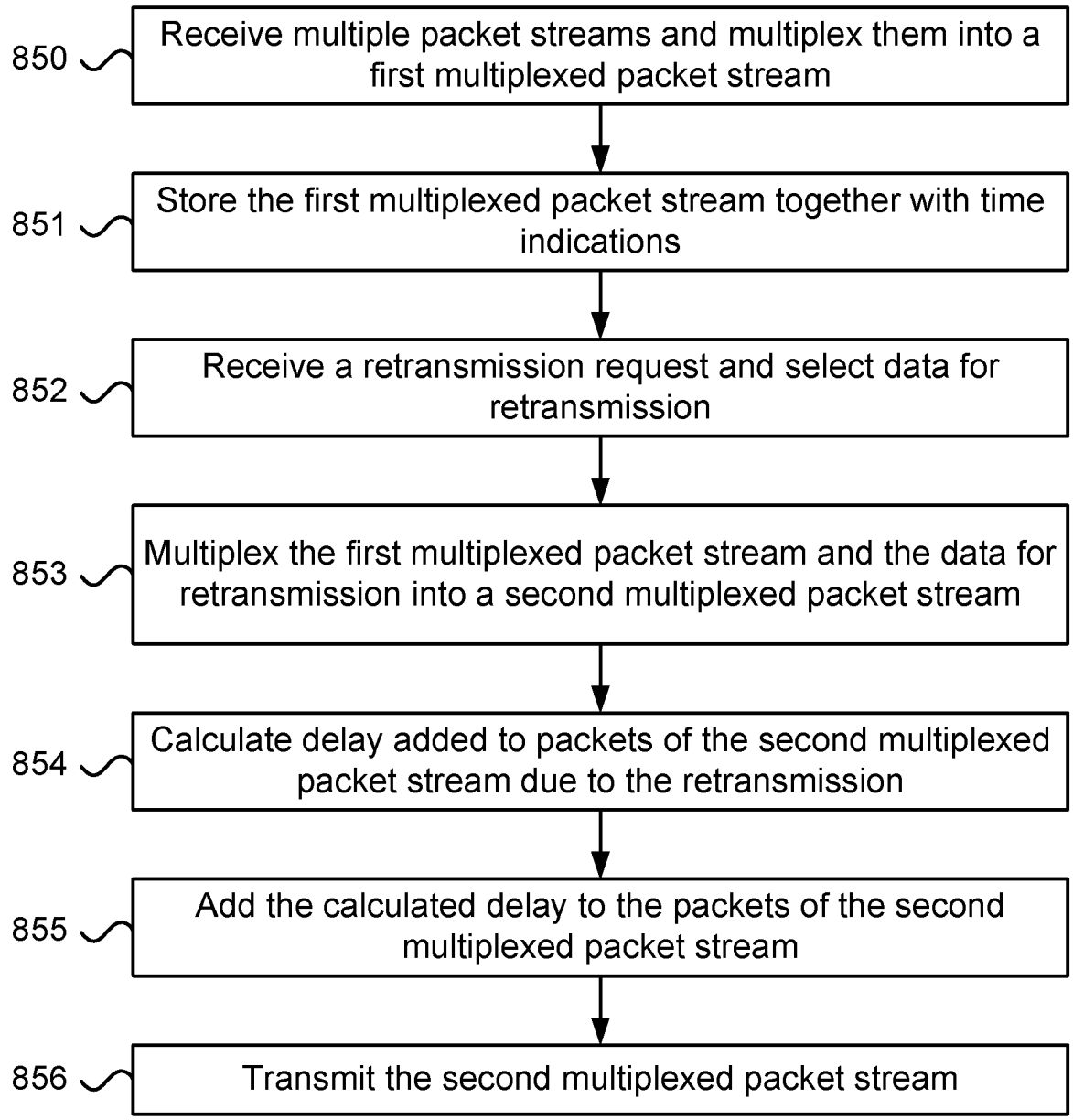
FIG. 6 illustrates one embodiment of a method for indicating delays added to packets due to retransmission events.

FIG. 6 illustrates one embodiment of a method for indicating delays added to packets due to retransmission events. The method includes the following steps: In step 850, receiving, by a transceiver, multiple packet streams and multiplexing them into a first multiplexed packet stream. In step 851, storing in memory the first multiplexed packet stream together with time indications. In step 852, receiving a retransmission request and selecting data for retransmission. In step 853, multiplexing the first multiplexed packet stream and the data for retransmission into a second multiplexed packet stream. In step 854, utilizing the time indications for calculating the delays that were added to packets of the second multiplexed packet stream as a result of fulfilling the retransmission request. In step 855, adding the calculated delay to at least some of the packets of the second multiplexed packet stream. And in step 856 transmitting by the transceiver the second multiplexed packet stream. Optionally, the retransmission request is received from a second transceiver to which the data for retransmission was already transmitted by the transceiver. Optionally, the memory is a shared memory, and the data for retransmission is selected from the first multiplexed packet stream stored in the memory. And optionally, the method may further include receiving link management packets, and multiplexing them into the second multiplexed packet stream.

Figure 7:
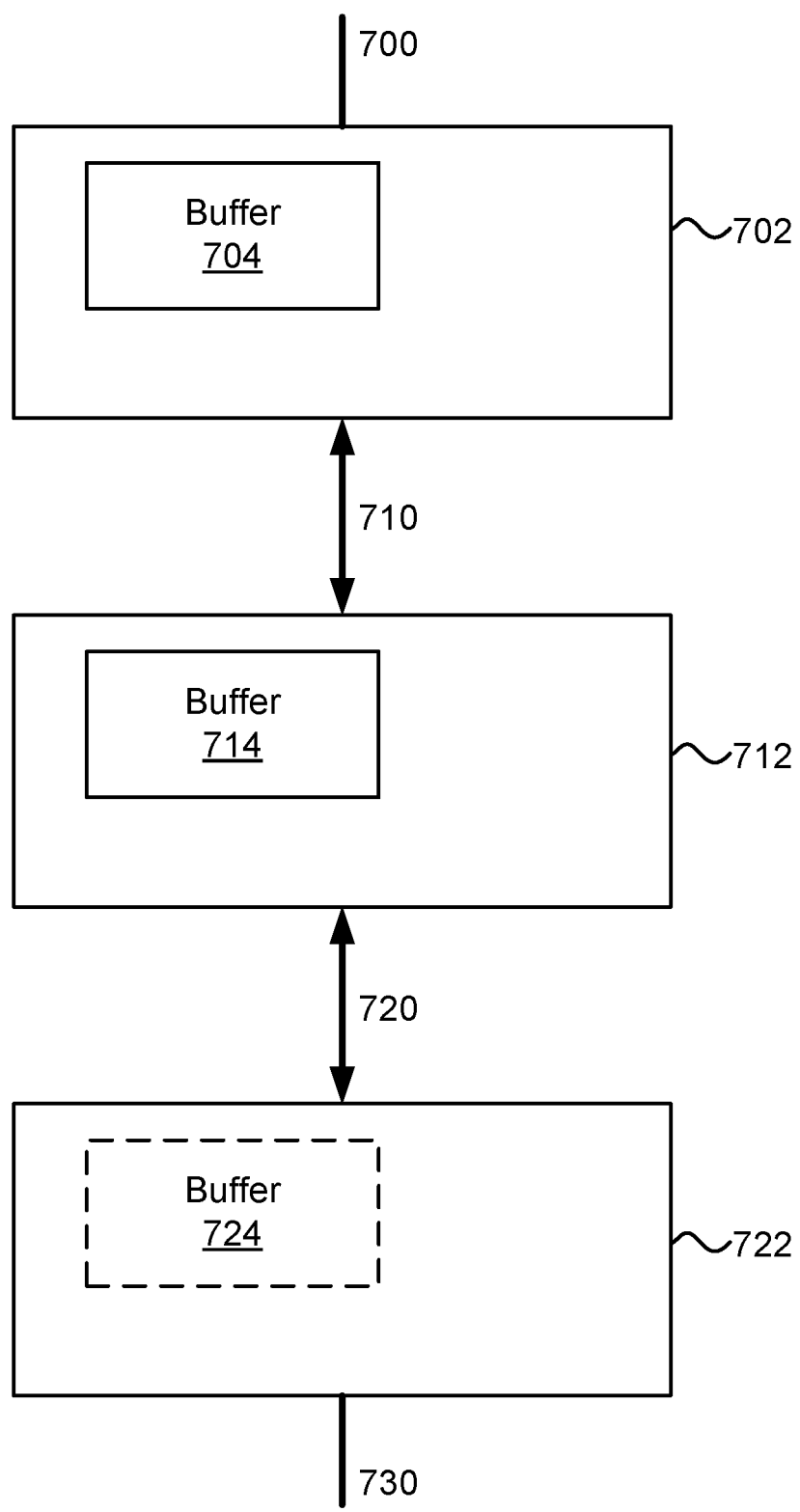
FIG. 7 illustrates one embodiment of a network that supports retransmissions with fixed and minimum delays.

FIG. 7 illustrates one embodiment of a network that supports retransmissions with fixed and minimum delays. The network includes at least a first transceiver 702, a second transceiver 712, and a third transceiver 722. The transceivers communicate over communication links (710, 720), which may be wired or wireless communication links.

The first transceiver 702 is configured to: (i) store data of first and second data types in a first buffer 704. In one example, the first data type is associated with Universal Serial Bus (USB) data, and the second data type is associated with uncompressed video data. The buffer 704 may be similar to buffer 606 in FIG. 3, or be implemented according to other suitable technique for storing and retrieving data. (ii) transmit to the second transceiver 712 packets comprising the data, wherein the data encoded with a first error resistance level. (iii) Receive a retransmission request from the second transceiver 712. The retransmission request may be implemented in any suitable form, such as a request for a certain packet, a request for a certain payload, and/or a request for certain data stored in the first buffer 704. And (iv) retransmit to the second transceiver 712 a packet comprising (in its payload) data of either the first or second data types, encoded with a second error resistance level. The second error resistance level is higher than the first error resistance level in order to reduce the number of retransmissions until achieving a successful delivery. Optionally, the second error resistance level is set to a level that ensures that a single retransmission is sufficient for a successful delivery. Alternatively, the second error resistance level is set to a level that ensures that a few retransmissions are sufficient for a successful delivery; for example, two retransmissions, or five retransmissions. Alternatively, the second error resistance level is improved with each additional retransmission, such that the first retransmission is encoded with an error resistance level that is better than the original transmission, the second retransmission is encoded with an error resistance level that is better than the first retransmission, and so forth. Optionally, the retransmission mechanism does not assure a successful delivery of the erroneous packets, and stops sending the retransmission packets after a predetermined duration and/or after a predetermined number of unsuccessful retransmission attempts.

The second transceiver 712 is configured to: (i) store the data received from the first transceiver in a second buffer 714. In one embodiment, the second buffer 714 is similar to buffer 704. (ii) transmit to the third transceiver 722, without waiting a fixed delay, the successfully-received packets comprising data of the first data type. The data of the first data type is encoded with the first error resistance level (in the first transmission attempt). Optionally, the second transceiver 712 transmits as soon as possible the successfully-received packets comprising data of the first data type, which means that the second transceiver 712 does not add unnecessary artificial delays before forwarding the successfully-received packets to the third transceiver 722. Alternatively, the second transceiver 712 delays the forwarding of the successfully-received packets comprising data of the first data type to the third transceiver 722, however, this delay is shorter than the delay applied to the successfully-received packets comprising data of the second data type. (iii) transmit to the third transceiver 722, after waiting the fixed delay, the successfully-received packets comprising data of the second data type. The data of the second data type is encoded with the first error resistance level (in the first transmission attempt). Waiting a fixed delay can be implemented as described above in relation to FIG. 3 and/or FIG. 4, or implemented according to other techniques for generating a fixed delay in packet-based communication channels. Optionally, the fixed delay is proportional to the Round Trip Delay (RTD). For example, the fixed delay may be equal or longer than one RTD between the second and third transceivers, and shorter than four RTDs. (iv) Receive a retransmission request from the third transceiver 722. The retransmission request may be implemented in any suitable form, such as a request for a certain packet, a request for a certain payload, and/or a request for certain data stored in the first buffer 714. And (v) Retransmit a packet comprising (in its payload) data of either the first or second data types, encoded with the second error resistance level. Optionally, the second error resistance level is set to a level that ensures that a single retransmission is sufficient for a successful delivery. Alternatively, the second error resistance level is set to a level that ensures that a few retransmissions are sufficient for a successful delivery. Alternatively, the second error resistance level is improved with each additional retransmission, such that the first retransmission is encoded with an error resistance level that is better than the original transmission, the second retransmission is encoded with an error resistance level that is better than the first retransmission, and so forth. Optionally, the retransmission mechanism does not assure a successful delivery of the erroneous packets, and stops sending the retransmission packets after a predetermined duration and/or after a predetermined number of unsuccessful retransmission attempts.

Optionally, the retransmission requests utilize the same type of packet identification codes for identifying packets comprising data of the first data type and packets comprising data of the second data type. Utilizing the same type of packet identification codes enables the transceivers to utilize the same scheme for processing both the first and second data types, and thus reduces the transceivers' cost. Additionally or alternatively, the second transceiver 712 is further configured to store in the second buffer both data of the first data type and data of the second data type. Additionally or alternatively, the second transceiver 712 may utilize the same enumeration for storing both data of the first data type and data of the second data type.

In one embodiment, the retransmission buffers, such as 704 and 714, have limited sizes in order to reduce the transceivers' cost. Optionally, the first and second transceivers may overwrite the data stored in the first and second buffers after storing it for a predetermined duration. When the buffers are cyclic buffers, the predetermined duration may be a function of the buffers' size. For example, the first and second transceivers may overwrite the data stored in the first and second buffers after storing it for a duration that is (i) at least equal to the fixed delay, and (ii) shorter than two times the fixed delay. In one embodiment, the first, second and third transceivers (702, 712, 722) are implemented using the same scheme, and thus the third transceiver includes buffer 724 that operates in a similar manner to buffers 704 and 714.

In one embodiment, the second transceiver 712 transmits at a predetermined fixed rate the packets comprising data of the second data type, and does not transmit at the predetermined fixed rate the packets comprising data of the first data type. Optionally, the maximal throughput of transmissions and retransmissions by the second transceiver 712 may approach the maximum capacity of a communication link that connects between the second and third transceivers. Optionally, the third transceiver 722 is coupled to an end device that does not support retransmission. Additionally or alternatively, the retransmitted packets are transmitted with a priority higher than priority assigned to the successfully-received packets. The higher priority reduces the average latency of the retransmitted packets in the network, and as a result also reduces the average end to end latency of the entire network.

The transceivers in FIG. 7 may communicate over various types of communication links. In one example, the communication links 710 and 720, which connect the first, second and third transceivers (702, 712, 722), are wired communication links. In another example, at least one of the communication links (710 and 720) is a wireless communication link. The first transceiver 702 may communicate with a first end-device (not illustrated in the figure) over a communication link 700. The third transceiver 722 may communicate with a second end-device (not illustrated in the figure) over a communication link 730. The first and second end devices may or may not support retransmission.

FIG. 8 illustrates one embodiment of a method for retransmitting with fixed and minimum delays. The method includes the following steps: In step 740, performing the following by a first transceiver: storing data of first and second data types in a first buffer; transmitting to a second transceiver packets comprising the data encoded with a first error resistance level; receiving from the second transceiver a retransmission request; and retransmitting a packet comprising data of either the first or second data types, encoded with a second error resistance level that is higher than the first error resistance level.

In step 742, performing the following by the second transceiver: storing the data received from the first transceiver in a second buffer; transmitting, by the second transceiver to a third transceiver, without waiting a fixed delay, successfully-received packets comprising data of the first data type, wherein the data of the first data type is encoded with the first error resistance level; and transmitting, by the second transceiver to the third transceiver, after waiting the fixed delay, successfully-received packets comprising data of the second data type, wherein the data of the second data type is encoded with the first error resistance level.

And in step 744, responsive to receiving a retransmission request from the third transceiver, retransmitting, by the second transceiver to the third transceiver, a packet comprising data of either the first or second data types, encoded with the second error resistance level, which is higher than the first error resistance level.

In one embodiment, the method further includes utilizing the same type of packet identification codes, in the retransmission requests, for identifying packets comprising data of the first data type and packets comprising data of the second data type. In another embodiment, the fixed delay is equal or longer than one Round Trip Delay (RTD) between the first transceiver and the second transceiver, and is shorter than five RTDs. In still another embodiment, the method further includes overwriting the data stored in the first and second buffers after storing it for a duration that is (i) at least equal to the fixed delay, and (ii) shorter than two times the fixed delay. In still another embodiment, the method further includes storing in the second buffer both data of the first data type and data of the second data type. In still another embodiment, the method further includes utilizing the same enumeration for storing both data of the first data type and data of the second data type. In still another embodiment, the method further includes transmitting at a predetermined fixed rate, by the second transceiver, the packets comprising data of the second data type, and not transmitting at the predetermined fixed rate, by the second transceiver, the packets comprising data of the first data type. And in still another embodiment, the method further includes transmitting as soon as possible the successfully-received packets comprising data of the first data type.

Herein, a predetermined value, such as a predetermined confidence level or a predetermined threshold, is a fixed value and/or a value determined any time before performing a calculation that compares a certain value with the predetermined value. A value is also considered to be a predetermined value when the logic, used to determine whether a threshold that utilizes the value is reached, is known before start of performing computations to determine whether the threshold is reached.

In this description, references to "one embodiment" (and its variations) mean that the feature being referred to may be included in at least one embodiment of the invention. Moreover, separate references to "one embodiment", "some embodiments", "another embodiment", and "still another embodiment" may refer to the same embodiment, may illustrate different aspects of an embodiment, and/or may refer to different embodiments.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the order of steps of the methods, or to details of implementation of the devices, set in the description, drawings, or examples. Moreover, individual blocks illustrated in the figures may be functional in nature and therefore may not necessarily correspond to discrete hardware elements. In the claims, the terms "first", "second" and so forth are to be interpreted merely as ordinal designations, and shall not be limited in themselves.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

I claim:

1. A network supporting retransmissions with fixed and minimum delays, comprising:
 a first transceiver configured to: store data of first and second data types in a first buffer; transmit to a second transceiver packets comprising the data of the first and second data types encoded with a first error resistance level; receive from the second transceiver a retransmission request; and retransmit a packet comprising data of either the first or second data types, encoded with a second error resistance level that is higher than the first error resistance level; and
 the second transceiver is configured to:
  store the data of the first and second data types received from the first transceiver in a second buffer;
  transmit to a third transceiver, without waiting a fixed delay, successfully-received packets comprising data of the first data type, which is encoded with the first error resistance level;
  transmit to the third transceiver, after waiting the fixed delay, successfully-received packets comprising data of the second data type, which is encoded with the first error resistance level;
  receive a retransmission request from the third transceiver; and
  retransmit a packet comprising data of either the first or second data types, encoded with the second error resistance level.

2. The network of claim 1, wherein the fixed delay is equal or longer than one Round Trip Delay (RTD) between the second and third transceivers, and is shorter than four RTDs.

3. The network of claim 1, wherein the retransmission requests utilize same type of packet identification codes for identifying packets comprising data of the first data type and packets comprising data of the second data type.

4. The network of claim 1, wherein the first and second transceivers are further configured to overwrite the data stored in the first and second buffers after storing it for a duration that is (i) at least equal to the fixed delay, and (ii) shorter than two times the fixed delay.

5. The network of claim 1, wherein the second transceiver is further configured to store in the second buffer data of the first and second data types.

6. The network of claim 1, wherein the second transceiver utilizes a same enumeration for storing data of the first and second data types.

7. The network of claim 1, wherein the second transceiver is further configured to transmit at a predetermined fixed rate the packets comprising data of the second data type, and not to transmit at the predetermined fixed rate the packets comprising data of the first data type.

8. The network of claim 7, wherein maximal throughput of transmissions and retransmissions by the second transceiver approaches maximum capacity of a communication link that connects between the second and third transceivers; and the third transceiver is coupled to an end device that does not support retransmission.

9. The network of claim 7, wherein the retransmitted packets are transmitted with a priority higher than priority assigned to the successfully-received packets;
whereby the higher priority reduces average latency of the retransmitted packets in the network.

10. The network of claim 7, wherein the first data type is associated with Universal Serial Bus (USB) data, and the second data type is associated with uncompressed video data.

11. The network of claim 1, wherein the second transceiver is configured to transmit as soon as possible the successfully-received packets comprising data of the first data type.

12. The network of claim 1, wherein the first and second transceivers communicate over a first wired communication link, and the second and third transceivers communicate over a second wired communication link.

13. The network of claim 1, wherein the first, second and third transceivers communicate over communication links, and at least one of the communication links is a wireless communication link.

14. A method for retransmitting with fixed and minimum delays, comprising:
performing the following by a first transceiver:
storing data of first and second data types in a first buffer;
transmitting to a second transceiver packets comprising the data of the first and second data types encoded with a first error resistance level;
receiving from the second transceiver a retransmission request; and
retransmitting a packet comprising data of either the first or second data types, encoded with a second error resistance level that is higher than the first error resistance level;
performing the following by the second transceiver:
storing the data of the first and second data types received from the first transceiver in a second buffer;
transmitting, by the second transceiver to a third transceiver, without waiting a fixed delay, successfully-received packets comprising data of the first data type, which is encoded with the first error resistance level;
transmitting, by the second transceiver to the third transceiver, after waiting the fixed delay, successfully-received packets comprising data of the second data type, which is encoded with the first error resistance level; and
responsive to receiving a retransmission request from the third transceiver, retransmitting, by the second transceiver, a packet comprising data of either the first or second data types, encoded with the second error resistance level.

15. The method of claim 14, wherein the retransmission requests utilize same type of packet identification codes for identifying packets comprising data of the first data type and packets comprising data of the second data type.

16. The method of claim 14, wherein the fixed delay is equal or longer than one Round Trip Delay (RTD) between the second and third transceivers, and is shorter than five RTDs.

17. The method of claim 14, further comprising overwriting the data stored in the first and second buffers after storing it for a duration that is (i) at least equal to the fixed delay, and (ii) shorter than two times the fixed delay.

18. The method of claim 14, further comprising storing in the second buffer data of the first and second data types.

19. The method of claim 14, further comprising utilizing a same enumeration for storing data of the first and second data types.

20. The method of claim 14, further comprising transmitting at a predetermined fixed rate, by the second transceiver, the packets comprising data of the second data type, and not transmitting at the predetermined fixed rate, by the second transceiver, the packets comprising data of the first data type.

21. The method of claim 14, further comprising transmitting as soon as possible the successfully-received packets comprising data of the first data type.

* * * * *